United States Patent [19]

Torii et al.

[11] 4,125,026
[45] Nov. 14, 1978

[54] DIFFERENTIAL DEVICE FOR VEHICLES

[75] Inventors: Kyozo Torii; Kenji Koshino, both of Toyota; Yuji Niimi, Aichi; Mashahiro Ogawa; Keizo Kamo, both of Toyota, all of Japan

[73] Assignee: Toyota Jidosha Kogyo Kabushiki Kaisha, Aichi, Japan

[21] Appl. No.: 590,075

[22] Filed: Jun. 25, 1975

[30] Foreign Application Priority Data

Dec. 23, 1974 [JP] Japan .............................. 49/139030[U]

[51] Int. Cl.$^2$ ........................... F16H 1/40; B21H 5/04
[52] U.S. Cl. ................................ 74/713; 29/159.2
[58] Field of Search ............................ 74/710–715; 219/121 EM; 29/159.2, 463, 469; 228/182

[56] References Cited

U.S. PATENT DOCUMENTS

| | | | |
|---|---|---|---|
| 1,471,915 | 10/1923 | Onge | 74/713 |
| 2,183,667 | 12/1939 | Buckendale | 74/713 |
| 3,926,065 | 12/1975 | Summer et al. | 74/424 |

*Primary Examiner*—William L. Freeh
*Attorney, Agent, or Firm*—Oblon, Fisher, Spivak, McClelland & Maier

[57] ABSTRACT

The present invention relates to a differential device for vehicles in which the differential casing is split into two casing portions including a left casing portion through which the left axle shaft runs and a right casing portion through which the right axle shaft runs, the two casing portions and the ring gear being joined together by electron beam welding after various devices are assembled into the differential casing, whereby assembly of various devices in the differential casing is facilitated; the differential casing and the ring gear being lightened by removal of redundant mass; the pinion shaft support in the differential casing being strengthened; and the pinion shaft being integrally fixed to the differential casing, thereby spreading the load and preventing slippage out of the pinion shaft.

2 Claims, 8 Drawing Figures

F I G. 2
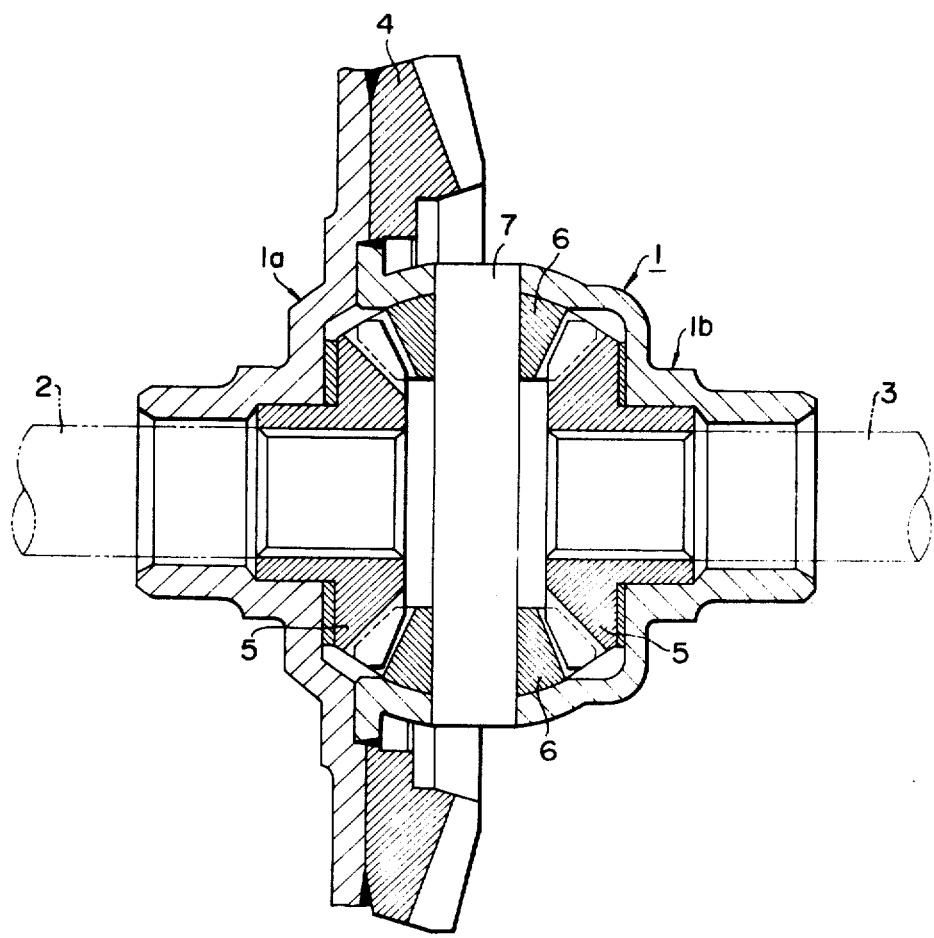

F I G. 3
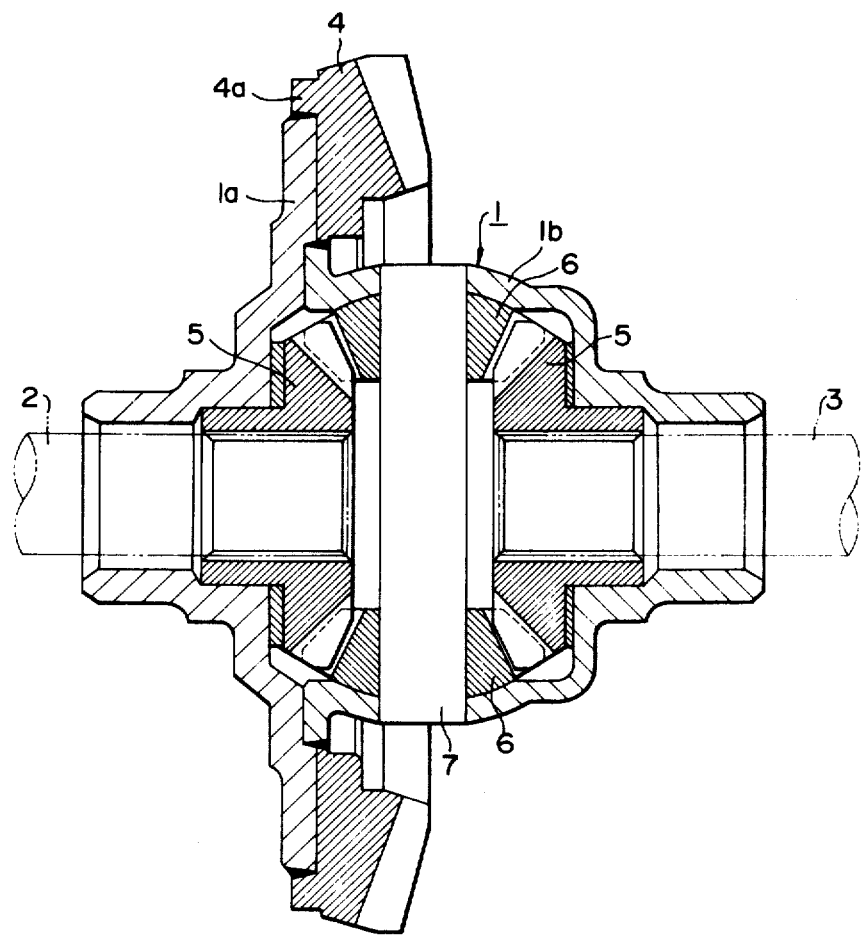

F I G. 6
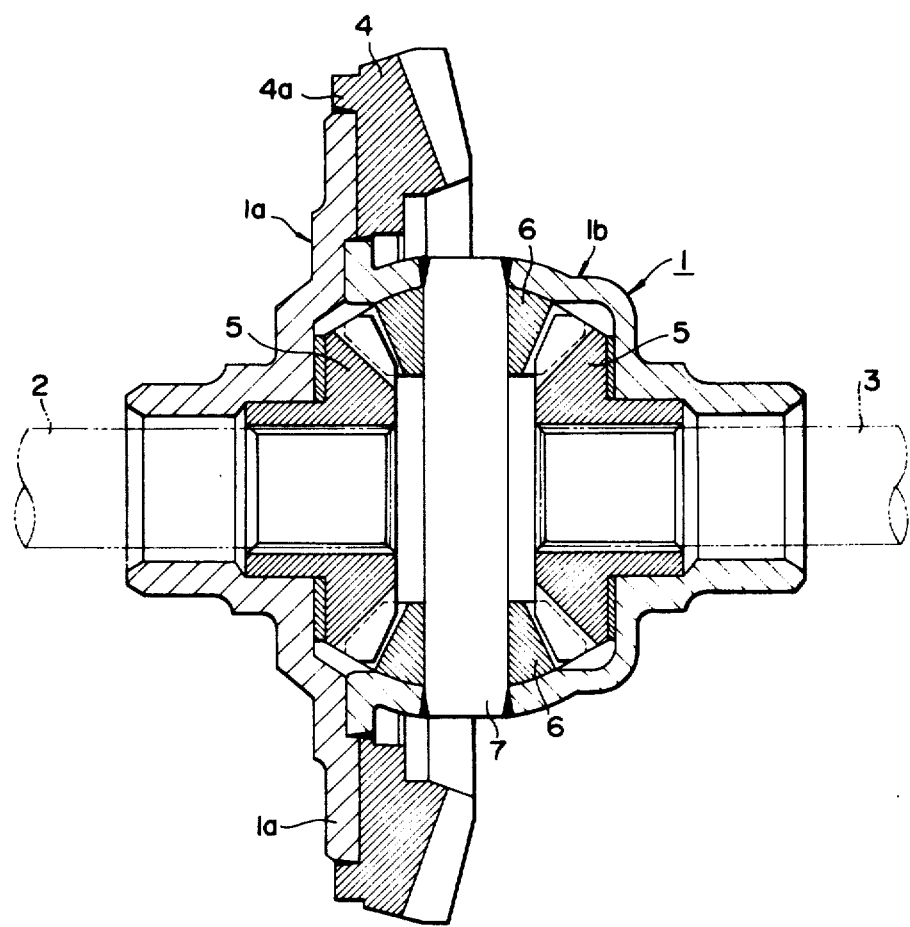

DIFFERENTIAL DEVICE FOR VEHICLES

BACKGROUND OF THE INVENTION

1. Field of the Invention

The present invention relates to a welded differential device for vehicles.

2. Description of the Prior Art

In a conventional differential device for automobiles and the like, the differential casing has been cast as an integral shell. The fitting of a ring gear to the differential casing has been done by integrally forming a ring gear-fitting flange around the differential casing on casting, boring bolt holes in the flange, providing screw holes in the ring gear, and assembling bolts through the bolt holes in the flange and into the screw holes in the ring gear. This method of assembly has been used because a cast differential casing has not been adaptable to welding. The supporting of the pinion shaft by the differential casing has been done by boring a pair of pinion shaft holes at opposed positions in the differential casing, fitting the pinion shaft into these holes and then providing anti-slipout pins.

The conventional differential device of such arrangement has the following demerits. Since the differential casing is integrally formed, it is difficult to assemble the gearing in the differential casing. Furthermore, since a fitting flange for the ring gear has to be integrally provided in the differential casing and this flange has to be sufficiently strong, the differential casing is necessarily extremely heavy. Since screw holes for the fitting bolts have to be provided in the ring gear, the ring gear has to be made thick, resulting in an increased mass of the gear. The presence of screw holes is likely to make the strain in the heat treatment of the ring gear uneven. Since a large number of bolt holes and screw holes have to be worked, the number of work steps is increased. Moreover, an anti-slipout means for the bolts, such as a lockplate, has to be provided. The pinion shaft support of the differential casing, which is subjected to a heavy load by the pinion shaft, is liable to be deformed or damaged, and to prevent such deformation or damage, the differential casing as a whole has to be made thick such that the weight thereof increases. The pinion shaft and the differential casing need pins for prevention of the pinion shaft from slipping out and this leads to a still more complicated configuration and increased weight of the device.

SUMMARY OF THE INVENTION

Accordingly, an object of the present invention is to provide a differential device for vehicles which is characterized by a split structure of the differential casing into a left casing portion through which the left axle shaft runs and a right casing portion through which the right axle shaft runs, whereby the assembling of internal gearing in the differential casing can be made very easy.

Another object of the present invention is to provide a differential device in which the right and left casing portions are electron beam welded to the ring gear, whereby the flange for fitting the ring gear can be dispensed with; the ring gear can be made small; the ring gear can be free from screw holes which cause uneven strain; the number of work steps can be decreased; and the whole device can be made lightweight.

Still another object of the present invention is to provide a differential device wherein the effects of welding strain in electron beam welding of the right and left casing portions to the ring gear on the ring gear tooth surface and on the differential gear can be minimized.

Still another object of the present invention is to provide a differential device in which the pinion shaft holes are provided at opposite positions on the internal surfaces of the right and left casing portions and a ring with sliding seats formed on the internal area where the pinion adjoins is inserted through the split gap and fastened, whereby the pinion shaft-running part of the differential casing can be strengthened without thickening the whole differential casing.

Still another object of the present invention is to provide a differential deivce in which the bored part for the pinion shaft support hole on the cylindrical wall of the differential casing in a split structure is partially formed flat and thick, whereby the pinion shaft-running part of the differential casing can be strengthened without thickening the whole differential casing.

Still another object of the present invention is to provide a differential device in which a pinion shaft is inserted through the differential casing of weldable structure and integrally welded thereto, whereby the load from the pinion shaft can be spread and slipout of the pinion shaft can be prevented.

BRIEF DESCRIPTION OF THE DRAWINGS

Various other objects, features and attendant advantages of the present invention will be more fully appreciated as the same becomes better understood from the following detailed description, when considered in connection with the accompanying drawings, wherein the reference characters designate like or corresponding parts in the several figures, and in which:

FIG. 2 is a sectional view of a differential device according to the present invention;

FIG. 3 is a sectional view of a differential device according to the present invention in which welding strain is prevented;

FIG. 6 is a sectional view of a differential device according to the present invention in which the pinion shaft is integrally fixed.

DETAILED DESCRIPTION OF THE PREFERRED EMBODIMENTS

Figure 1:
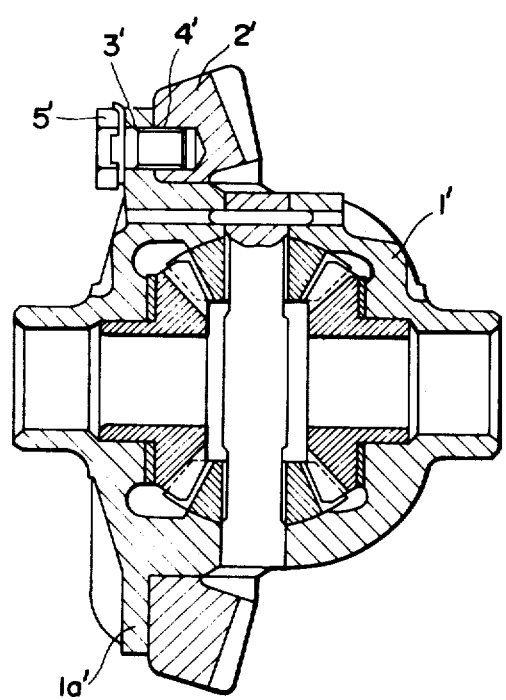
FIG. 1 is a sectional view of a conventional differential device.

The conventional differential device for automobiles and the like is shown in FIG. 1, wherein a differential casing 1' is formed integrally by casting and the fitting of a ring gear 2' to the differential casing 1' is done by integrally forming a ring gear-fitting flange 1a' around the differential casing 1', providing bolt holes 3' in the flange 1a' and screw holes 4' in the ring gear 2', the fitting bolts 5' through the bolt holes 3' in the flange 1a' to the screw holes 4' in the ring gear 2', while a preferred embodiment of the present differential device is shown in FIGS. 2 through 6.

Referring now to FIG. 2, wherein there is shown a left casing portion 1a through which a left axle shat 2 runs and a right casing portion 1b through which a right axle shaft 3 runs. The casing portions are fabricated of a weldable metal, such for example as, low-carbon steel by plastic working, and have nearly the same thickness of wall. Either the left casing portion 1a or the right casing portion 1b, for instance the left casing portion 1a, is then integrally joined to a ring gear 4 by electron beam welding from the side of the left casing portion 1a. A side gear 5 and a pinion 6, to be internally provided in the differential casing 1, are next respectively assembled in the casing portions 1a, 1b from the open end. Thereafter, the right casing portion 1b is internally positioned in the ring gear 4 and is electron beam welded from the side of the right casing portion 1b, thereby consolidating the ring gear 4, the left casing portion 1a, and the right casing portion 1b together.

In electron beam welding, the vicinity of the welded part is heated with a high degree of energy concentration and accordingly welding strain can be minimized. Under this arrangement, various parts to be internally provided in the differential casing 1 can be inserted through the split gap between the casing portions 1a and 1b, thereby facilitating the assembling work. Plastic formation of the differential casing 1 with steel plate permits unification of the wall with the minimum thickness necessary from a standpoint of strength, thereby realizing a substantial reduction of weight with the removal of redundant mass. Since there is no need for providing screw holes, the ring gear 4 can have a minimum thickness of wall necessary for torque transmission, thereby contributing further to weight reduction. Non-use of bolts renders it needless to provide an anti-slipout means for bolts, thereby reducing the number of steps in assembly work. Since no screw holes are provided in the rear gear 4, there is no likelihood of uneven strain being created by heat treatment.

In FIG. 3, is illustrated a differential device in which welding strain caused in joining the two casing portions 1a, 1b to the ring gear 4 is minimized. An annular projection 4a is formed on the back side of the ring gear 4. The left casing portion 1a and the ring gear 4 are electron beam welded, with the left casing portion 1b fitted inside the annular projection 4a. As the annular projection 4a is made sufficiently less rigid than the whole ring gear 4, there is practically no possiblity of the ring gear 4 being deformed on account of welding strain in the annular projection. On the other hand, the right casing portion 1b is internally fitted in the ring gear 4 and joined thereto by electron beam welding from the side of the right casing portion 1b. This welding is executed on the inside of the ring gear 4 of greater rigidity, so the tooth surface of the ring gear 4 is unlikely to become strained. Shrinkage due to welding strain takes place in such a direction that it cancels the shrinkage in the welding between the left casing portion 1a and the ring gear 4. Thus, in a differential device of such arrangement, the deformation and strain due to welding can be minimized.

Figure 4:
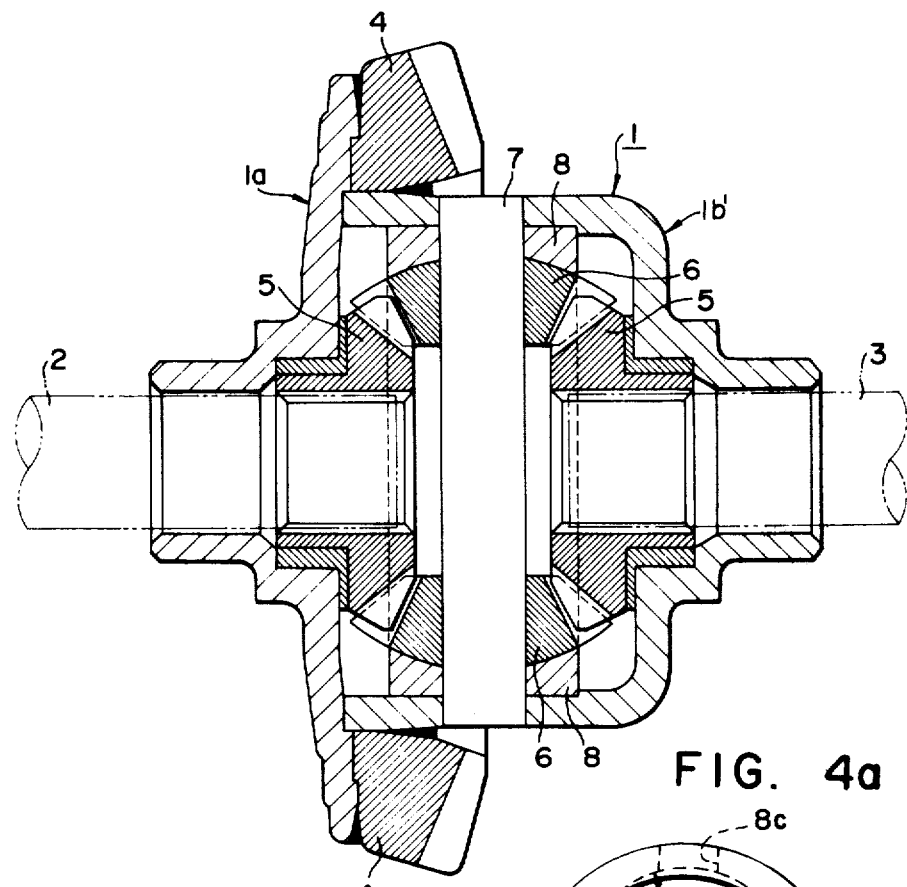
FIG. 4 is a sectional view of a differential device according to the present invention in which a ring has been inserted.
Figure 4A:
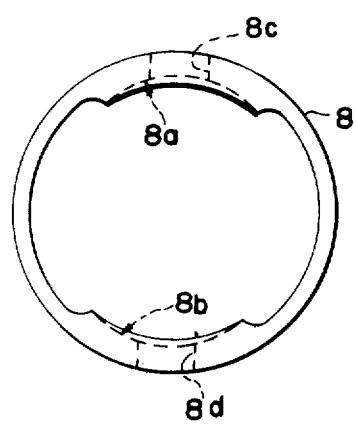
FIG. 4a is a side elevational view of a ring member of FIG. 4.

In FIG. 4, is illustrated a differential device in which a ring 8 is fitted on the inside of either the left casing portion 1a or the right casing portion 1b supporting the pinion shaft 7. The support position of the pinion shaft 7 in the differential casing 1 is on a part where the load of the pinion shaft 7 falls and accordingly the heaviest deformation and damage are liable to occur. Adoption of a differential casing 1 which is split into two portions permits insertion of the reinforcing ring 8, which partially bears the load from the pinion shaft 7. As shown in FIG. 4a, the ring 8 has a pair of seats 8a, 8b provided at opposite positions where the pinion shaft runs; and the seats 8a, 8b have the pinion shaft holes 8c, 8d bored therethrough, It is desirable that the seats 8a, 8b, which constitute the sliding surface for the pinion gear 6, be provided with appropriate anti-seizure means. An appropriate method of fitting the ring 8 to the differential casing 1 is in the use of welding or use of pins. In the differential device constructed as above, the contact pressure between the pinion shaft 7 and the differential casing 1 can be lowered and the strength of the differential casing 1 can be increased.

Moreover, manufacture and assembly are relatively easy, because there is no need of forming seats of the pinion gear 6 on the inside of the differential casing 1.

Figure 5:
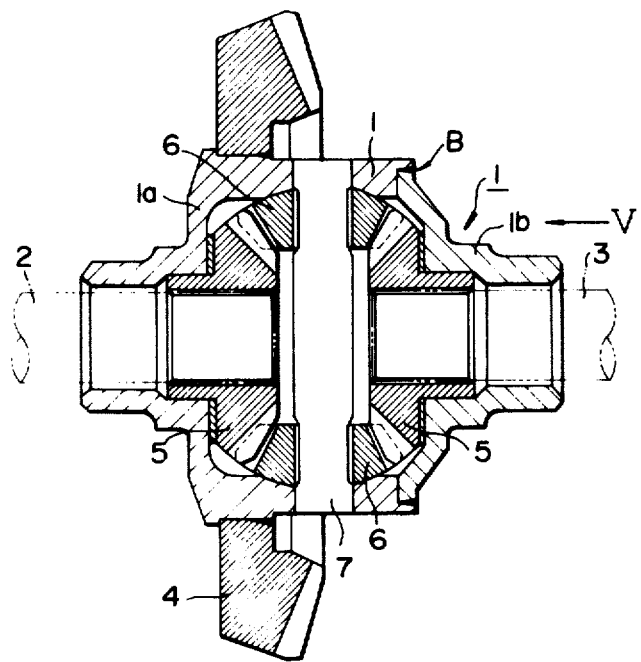
FIG. 5 is a sectional view of a differential device according to the present invention in which the pinion shaft-running part is made thick, FIG. 5a showing a section of the left casing portion viewed from the right casing portion along arrow V of FIG. 5.
Figure 5A:
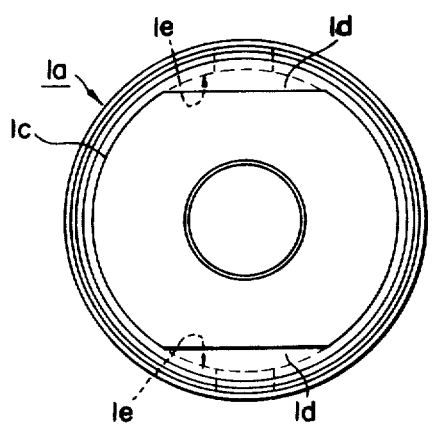

In FIG. 5, is illustrated a differential device in which the pinion shaft-running part in the differential casing 1 has an increased wall thickness. In this device, either the left casing portion 1a or the right casing portion 1b, supporting the pinion shaft 7, for instance the left casing portion 1a is plastic-worked as shown in FIG. 5a, where the inside of the cylindrical wall of the left casing portion 1a is partially made flat with a thickened part 1d; and at the center of the thickened part 1d, the pinion shaft supporting hole is provided. Incidentally, a spherical seat 1e, with which the pinion 6 slidingly contacts, may be formed on the inside of the thickened part 1d. Under this arrangement, the contact area between the pinion shaft 7 and the differential casing 1 can be widened and the contact area can be prevented from being damaged or deformed. Pinion shaft 7, as shown in FIGS. 2–5 can be secured to the casing portions by welding, as shown in FIG. 6, or by caulking or conventional pins.

In FIG. 6 is illustrated a differential device in which the pinion shaft 7 is integrally fitted to the differential casing 1. The differential casing 1 is fabricated of a weldable metal, such that the pinion shaft 7 can be welded to the differential casing 1. With the pinion shaft 7 fitted into the pinion shaft hole of the differential casing 1, welding is executed around the pinion shaft 7. Under this arrangement, the load from the pinion shaft 7 to the differential casing 1 can be evenly spread around the pinion shaft 7, thereby suppressing the occurrence of deformation or damage in the support of the pinion shaft 7 in the differential casing 1. Furthermore, there is no need for providing a special anti-slipout pin for the pinion shaft 7 and accordingly the number of work steps can be decreased.

Obviously, many modifications and variations of this invention are possible in light of these teachings. It is to be understood therefore that within the scope of the appended claims, the present invention may be practiced otherwise than as specifically described herein.

What is claimed as new and intended to be covered by Letters Patent is:

1. A differential device comprising:
   a left casing portion which constitutes a part of a differential casing and through which a left axle shaft runs;
   a right casing portion which constitutes the remaining part of said differential casing and is directly or through a ring gear integrally joined to said left casing portion by electron beam welding wherein said left and said right casing portions comprise casings of steel plate formed by plastic working;

side gears respectively disposed in said right and left casing portions, and a pinion mounted within one of said casing portions and interposed between and operatively engaged with said side gears; and a ring gear which is electron beam welded integrally to at least one of said casing portions and joined with said casing portions at a first position located at the outer periphery portion on the backside of said ring gear and at a second position located at the inner periphery portion of said ring gear such that the deformation due to welding strain at said second position cancels the deformation due to welding strain at said first position to minimize the resulting deformation and strain due to welding wherein pinion shaft holes are provided at opposite positions in one of said casing portions and wherein a pinion shaft inserted into said holes and said casing portion are integrally welded together.

2. A differential device comprising:

a left casing portion which constitutes a part of a differential casing and through which a left axle shaft runs;

a right casing portion which constitutes the remaining part of said differential casing and is directly or through a ring gear integrally joined to said left casing portion by electron beam welding, side gears respectively disposed in said right and left casing portions, and a pinion mounted within one of said casing portions and interposed between, and operatively engaged with, said side gears;

a ring gear which is electron beam welded integrally to at least one of said casing portions; and, wherein the internal cylindrical wall of one of said casing portions is partially formed flat with a thickened part for supporting a pinion shaft; and wherein pinion shaft supporting holes are bored in said thickened part.

* * * * *